(12) United States Patent
Corbille et al.

(10) Patent No.: US 8,472,775 B2
(45) Date of Patent: Jun. 25, 2013

(54) ENCLOSURE FOR TELECOMMUNICATIONS CABLES, WITH REMOVABLE ORGANIZER

(75) Inventors: Christophe Corbille, Saint Nicolas de Redon (FR); Patrick Drouard, Pontchateau (FR)

(73) Assignee: 3M Innovative Properties Company, St. Paul, MN (US)

( * ) Notice: Subject to any disclaimer, the term of this patent is extended or adjusted under 35 U.S.C. 154(b) by 285 days.

(21) Appl. No.: 13/059,604

(22) PCT Filed: Sep. 16, 2009

(86) PCT No.: PCT/US2009/057171
§ 371 (c)(1),
(2), (4) Date: Feb. 17, 2011

(87) PCT Pub. No.: WO2010/039435
PCT Pub. Date: Apr. 8, 2010

(65) Prior Publication Data
US 2011/0164853 A1 Jul. 7, 2011

(30) Foreign Application Priority Data
Sep. 23, 2008 (EP) ..................................... 08164870

(51) Int. Cl.
*G02B 6/00* (2006.01)
*G02B 6/44* (2006.01)
*H05K 5/00* (2006.01)
*H05K 5/06* (2006.01)

(52) U.S. Cl.
USPC .......................................... 385/135; 385/147

(58) Field of Classification Search
USPC ................... 385/135–139, 147; 174/520, 50.5
See application file for complete search history.

(56) References Cited

U.S. PATENT DOCUMENTS

| 4,236,047 A | * | 11/1980 | Haeder ....................... 174/77 R |
| 5,127,082 A | | 6/1992 | Below et al. |
| 5,479,553 A | | 12/1995 | Daems et al. |
| 6,253,016 B1 | | 6/2001 | Daoud |
| 6,275,640 B1 | | 8/2001 | Hunsinger et al. |
| 7,653,282 B2 | * | 1/2010 | Blackwell et al. ............ 385/135 |
| 2002/0051616 A1 | | 5/2002 | Battey et al. |
| 2004/0062508 A1 | | 4/2004 | Blankenship et al. |
| 2005/0175307 A1 | | 8/2005 | Battey et al. |
| 2006/0193587 A1 | | 8/2006 | Wittmeier et al. |
| 2007/0007038 A1 | * | 1/2007 | Cox et al. ...................... 174/650 |

(Continued)

FOREIGN PATENT DOCUMENTS

| DE | 42 18 378 A1 | 12/1993 |
| EP | 0 716 325 A1 | 6/1996 |

(Continued)

*Primary Examiner* — Akm Enayet Ullah
(74) *Attorney, Agent, or Firm* — Janet A. Kling

(57) ABSTRACT

An enclosure for receiving at least one telecommunication cable comprises a housing (1) at least one portion (7) of which is configured for the passage of a cable (25) into/out of the enclosure. The housing portion (7) is repositionable to change the direction of passage of the cable relative to the housing. A sealing assembly (40, 44, 46) is provided that is split lengthwise whereby it can be fitted to the cable (25) after the cable has been passed into/out of the housing. A removable organizer unit (100) is also provided, for use in the housing (1), which offers storage (102) for slack cable (150) and for splice trays (118). Following removal from the housing, the organizer unit (100) can be supported on the housing (1) in a "work bench" position.

17 Claims, 13 Drawing Sheets

U.S. PATENT DOCUMENTS

| | | |
|---|---|---|
| 2007/0086721 A1 | 4/2007 | Dobbins et al. |
| 2007/0278005 A1 | 12/2007 | Holmberg et al. |
| 2011/0217017 A1* | 9/2011 | Drouard et al. ............... 385/135 |
| 2011/0280525 A1* | 11/2011 | Marcouiller et al. ........... 385/99 |

FOREIGN PATENT DOCUMENTS

| | | |
|---|---|---|
| EP | 0 785 450 A1 | 7/1997 |
| EP | 1 122 571 A1 | 8/2001 |
| GB | 453 236 | 9/1936 |
| JP | 05-113509 | 5/1993 |
| WO | WO 94/12904 A2 | 6/1994 |
| WO | WO 95/02203 A1 | 1/1995 |
| WO | WO 95/06347 A1 | 3/1995 |
| WO | WO 96/30792 A2 | 10/1996 |
| WO | WO 00/28365 A1 | 5/2000 |
| WO | WO 2008/048935 | 4/2008 |

* cited by examiner

ENCLOSURE FOR TELECOMMUNICATIONS CABLES, WITH REMOVABLE ORGANIZER

CROSS REFERENCE TO RELATED APPLICATIONS

This application is a national stage filing under 35 U.S.C. 371 of PCT/US2009/057171, filed Sep. 16, 2009, which claims priority to European Patent Office Application No. 08164870.1, filed Sep. 23, 2008, the disclosure of which is incorporated by reference in its/their entirety herein.

THE FIELD OF THE INVENTION

The present invention relates generally to enclosures for telecommunications cables. More especially, the invention relates to enclosures for telecommunication lines and telecommunication line splices.

BACKGROUND OF THE INVENTION

Telecommunication cables are ubiquitous and used for distributing all manner of data across vast networks. The majority of cables are electrically conductive cables (typically copper), although the use of optical fiber cables is growing rapidly in telecommunication systems as larger and larger amounts of data are transmitted. A telecommunication cable typically includes a bundle of individual telecommunication lines (either optical fibers or copper wires) that are encased within a protective sheath. As telecommunication cables are routed across data networks, it is necessary to periodically open the cable so that one or more telecommunication lines therein may be spliced, thereby allowing data to be distributed to other cables or "branches" of the telecommunication network. The cable branches may be further distributed until the network reaches individual homes, businesses, offices, and so on.

At each point where a telecommunication cable is opened, it is necessary to provide some type of enclosure to protect the exposed interior of the cable. Commonly, the enclosure has one or more ports through which cables enter and/or exit the enclosure. Once inside the enclosure, the cable is opened to expose the telecommunication lines therein. Conventional telecommunication enclosures are constructed to facilitate the management and protection of individual telecommunication lines and splices thereof. For example, conventional enclosures have re-enterable housings and are designed to incorporate splice trays to assist the formation of a splice connection between two telecommunication lines. Once all required splices are made, the enclosure is secured to protect the opened portion of the cable from moisture, dust, insects, and other hazards.

Conventional telecommunication enclosures, also known as distribution boxes, are found in a wide variety of locations, many of which present particular challenges in terms of accessibility for installation and maintenance. For example, with the growing use of optical fibres in telecommunications systems, enclosures for optical fibre cables are increasingly being located on the façades of buildings, often at a height of several meters to reduce the risk of vandalism. The installation and maintenance of such enclosures must be carried out from a ladder or a lift and should, therefore, be made as simple as possible to reduce costs and increase efficiency.

Enclosures that are suitable especially for the protection and management of optical fibre telecommunication lines and splices are described, for example, in US 2007/0086721; 2006/01935867; 2005/0175307; U.S. Pat. Nos. 6,275,640; 6,253,016; and 5,479,553; and in WO 2008/048935; 00/28365; 96/30792; 95/02203; and 94/12904.

SUMMARY OF THE INVENTION

The present invention is concerned with increasing the versatility of telecommunications enclosures as regards the entry and exit direction of cables, with a view to enabling a single basic form of enclosure to be used in a variety of different situations. The present invention is also concerned with the provision of a comparatively simple assembly for passing a telecommunications cable, particularly an uncut cable, in a sealed manner into an enclosure. The present invention is further concerned with facilitating the management of splice connections and slack cable in a telecommunications enclosure.

In one aspect, the present invention provides an enclosure for receiving at least one telecommunication cable, the enclosure comprising a housing at least one portion of which is configured for the passage of a telecommunications cable into/out of the enclosure, wherein the said housing portion is repositionable in the housing to change the direction of passage of the cable relative to the housing.

The housing portion may include an outwardly-extending cable guide, the direction of which relative to the housing can be changed by repositioning the housing portion in the housing. The cable guide may extend at an angle from the housing portion such that, by repositioning the housing portion, the direction is changed. The housing portion itself may also be located at an angle relative to the remainder of the housing whereby the repositioning of the housing portion also affects the direction of the cable guide relative to the remainder of the housing. In an embodiment of the invention, the housing is generally rectangular and the housing portion extends across a corner of the housing at an angle of about 45° to the adjacent sides of the housing. The cable guide in turn extends at an angle of about 45° from the housing portion so that, by turning the housing portion through 180°, the direction of the cable guide can be turned through 90° relative to the remainder of the housing. A sealing assembly may be provided to seal a cable within the cable guide.

The housing portion, including the cable guide, may be split to enable it to be placed around a cable after the cable has been passed into/out of the enclosure. The housing portion may, for example, be formed in two parts that are releasably secured together. In an embodiment of the invention, the two parts of the housing portion are secured together by screws, at least one of which is also used in securing a cable grip around the cable within the cable guide.

The housing portion may be slideable into and out of the housing and may be retained in the housing by interengaging grooves on the housing portion and the adjacent parts of the housing. The interengaging grooves may form a labyrinthine seal between the housing portion and the adjacent parts of the housing.

In this aspect of the invention, an organizer may be located within the housing to provide a support for one or more cable splice trays. The organizer may also provide a compartment for the storage of slack cable within the housing.

In another aspect, the present invention provides an assembly for passing a telecommunication cable into/out of an enclosure, the assembly comprising a cable guide containing a sealing gasket that surrounds the cable and, at one end, abuts a stop within the cable guide and, at the other end, is engaged by an abutment member; and a locking member that secures around the cable guide to retain the sealing gasket and the abutment member therein and to move the abutment member along the cable within the cable guide to compress the sealing gasket longitudinally and cause it to expand radially to seal against the outside of the cable and the inside of the cable guide; wherein the assembly is split in the lengthwise direction of the cable whereby it can be fitted to the cable after the cable has been passed into/out of the enclosure, and the abutment member is constrained against rotation within the cable guide.

If the sealing gasket is sufficiently flexible, a single split only may be required to enable it to be fitted around the cable. The abutment member and the locking member are typically less flexible and are split into at least two parts to enable them to be fitted around the cable. The parts of the locking member may be inter-engageable in the direction of the length of the cable, to prevent them moving apart radially relative to the cable while they are being secured around the cable guide.

In this aspect of the invention also, an organizer may be located within the enclosure to provide a support for one or more cable splice trays. The organizer may also provide a compartment for the storage of slack cable within the enclosure.

In yet another aspect, the present invention provides an enclosure for receiving at least one telecommunications cable, the enclosure comprising a housing containing an organizer; the organizer comprising a platform which, on one side, has a compartment accessible from one direction for the storage of slack cable and, on the opposite side, has a support accessible from the other direction for the storage of at least one cable splice tray; wherein the organizer, together with the storage compartment and the splice tray(s) and any slack cable/spliced telecommunication lines therein, is removable from the housing.

In an embodiment of the invention, the platform comprises the base of the storage compartment in back-to-back relationship to the support.

In use, following removal from the housing, the organizer can be advantageously be engaged with the housing on the outside thereof, for example in a position providing access to the storage compartment. In an embodiment of the invention, the organizer has an outwardly-projecting arm engageable in a corresponding guide on the outside of the housing. Alternatively, by allowing slack cable to feed out from the storage compartment, the organizer can be removed to a location remote from the housing.

BRIEF DESCRIPTION OF THE DRAWINGS

By way of example only, a telecommunications enclosure in accordance with the invention will be described with reference to the accompanying drawings, in which.

DESCRIPTION OF THE PREFERRED EMBODIMENTS

By way of example, an embodiment of the invention is described herein as used with optical fibre telecommunication cables. It should be understood, however, that the invention is applicable to all forms of cable employed in the field of telecommunications including not only optical fiber cables but also, for example, copper wire cables, coaxial cables, drop lines, branch lines, and distribution lines. Similarly, although the invention is described herein as used with optical fibre splices, it should be understood that it is applicable to all forms of interconnection employed in the field of telecommunications.

Figure 1:
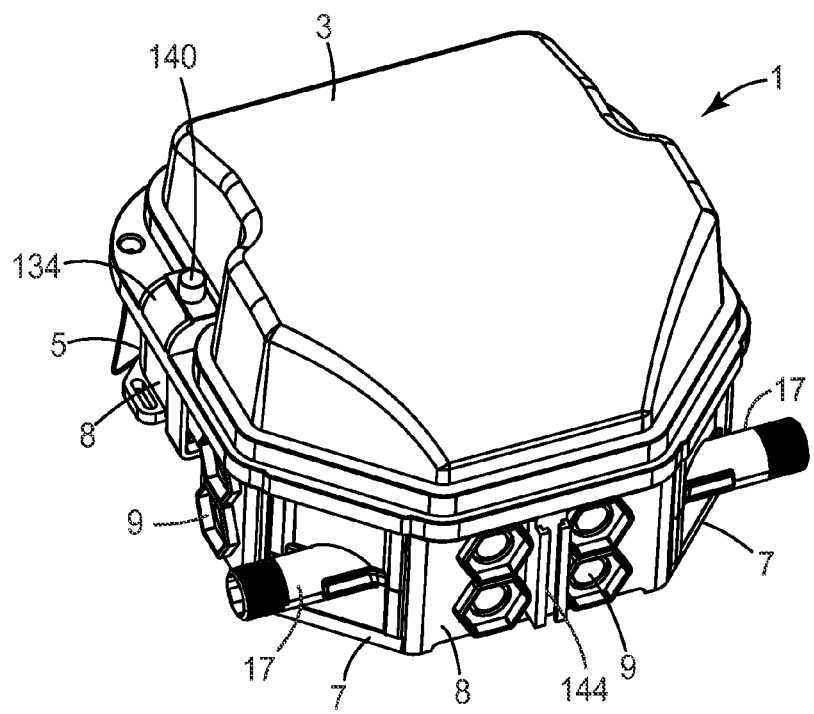
FIG. 1 is a perspective view of the housing of the telecommunications enclosure.

The enclosure shown in FIG. 1 of the drawings has a box-like housing 1 comprising a removable cover 3 and a base 5. Two portions of the base 5, specifically corner walls 7 that extend at an angle (45° in this case) between the adjacent sides 8 of the base, are configured for the passage, into and out of the housing 1, of a cable (assumed, for the purposes of this description, to be a main service cable) not shown here. The construction of these corner walls 7 of the base 5 will be described in greater detail below. The base 5 also contains a number of entry port locations 9 at which openings can be made into the housing 1 as required for additional cables (assumed, for the purposes of this description, to be drop cables) not shown here.

As described below, the housing 1 is intended to contain an organizer providing a compartment for the storage of slack cable and support for splice trays in which splices between telecommunication lines can be arranged in known manner. The organizer will be described in greater detail below.

The housing 1 is intended to be mounted on a vertical surface, for example the façade of a building, with the removable cover 3 facing outwards, and holes 11 (see FIG. 2) for appropriate fixing means are provided in the bottom 13 of the base 5 for this purpose. Access to the interior of the box, for the installation of cables and the formation of splices, is obtained by removing the cover 3 which remains attached to the base by a cord (not shown) and can be allowed to hang freely while the installation/splicing work is carried out. Alternatively, or in addition, the cover 3 may be pivotally-attached to the base 5 so that it can be opened to provide access to the interior of the housing 1 without being removed completely. The pivotal attachment would typically be located at the top of the back of the base 5 (as seen in FIG. 2) and advantageously would provide alternative open positions for the cover, for example positions in which the cover 3 is opened through 90° or 180°.

The corner walls 7 of the base 5 of the housing 1 are removable and can be repositioned to change the entry/exit directions of the main service cable as required. FIG. 1 shows the entry and exit both being in what would be the horizontal direction when the housing is mounted on a vertical surface as described above but, by repositioning the corner walls 7 as described below, they could individually be moved into the vertical direction if required.

Figure 2:
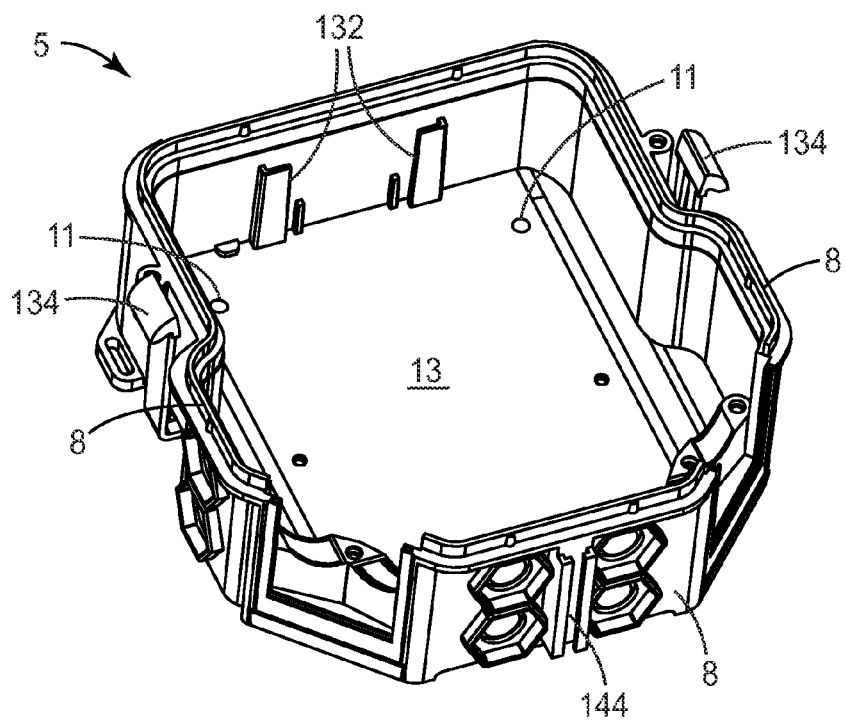
FIG. 2 is a similar view of the base of the empty housing, prior to the insertion of the cable entry and exit portions.

FIG. 2 shows the base 5 of the housing 1 with the corner walls 7 removed, exposing ends of the adjacent sides 8 of the base. Each corner wall 7 is in two parts 15, 16 (shown in FIG. 3) each of which provides a respective section 7A, 7B of the corner wall 7 of the base and a respective half 17A, 17B of a cable guide 17 that, in the assembled housing, extends from the base and is externally-threaded at one end. The side edges of the wall sections 7A, 7B are shaped to slide onto the exposed ends of the adjacent sides 8 of the base 5 to form the corner wall 7 as will be described in greater detail below. As shown, each part 17A, 17B of the cable guide extends at an angle (in this case, 45°) from the respective wall section 7A, 7B and it can be seen that, if the two parts 15, 16 of the corner wall 7 were to be slid into position in the base in the orientation shown in FIG. 3, the cable guide 17 would extend to the right from the corner wall. If, however, the two parts 15, 16 of the corner wall 7 were to be inverted (i.e. rotated through 180°), the cable guide 17 would extend out of the page towards the viewer. If the angle between the cable guide 17 and the corner wall 7 and/or the angle between the wall 7 and the rest of the base 5 were to be changed, the effect of inverting the two parts 15, 16 of the corner wall would, of course, be different.

Figure 3:
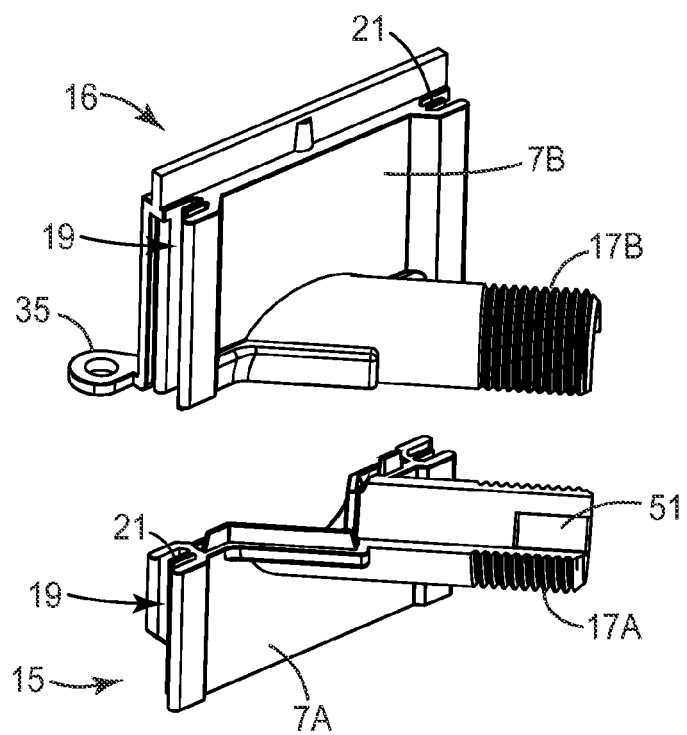
FIG. 3 shows the two parts of a cable entry/exit portion for the base of FIG. 2.
Figure 4A:
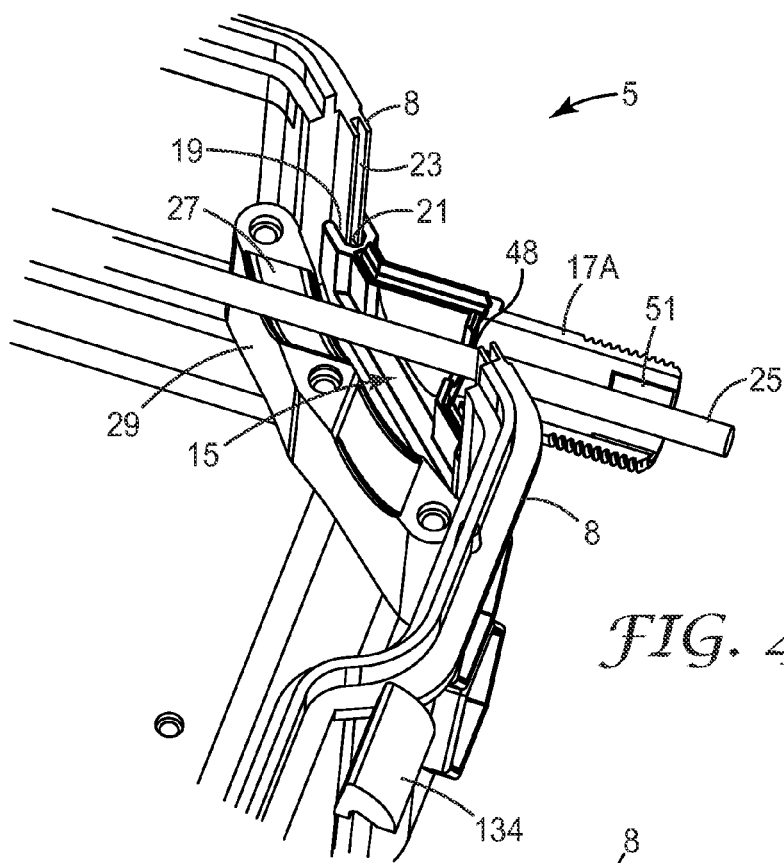
FIGS. 4A to 4C are detailed views of part of the base of FIG. 2, showing successive stages in the assembly of the cable entry/exit portion.
Figure 4B:
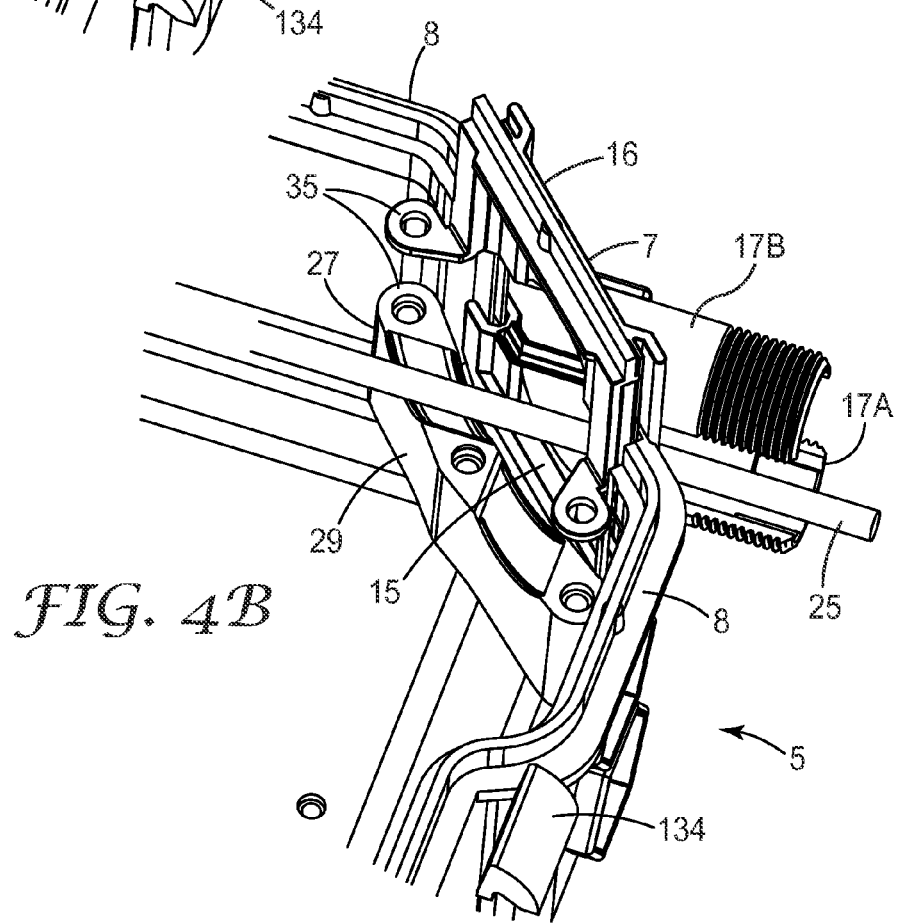
Figure 4C:
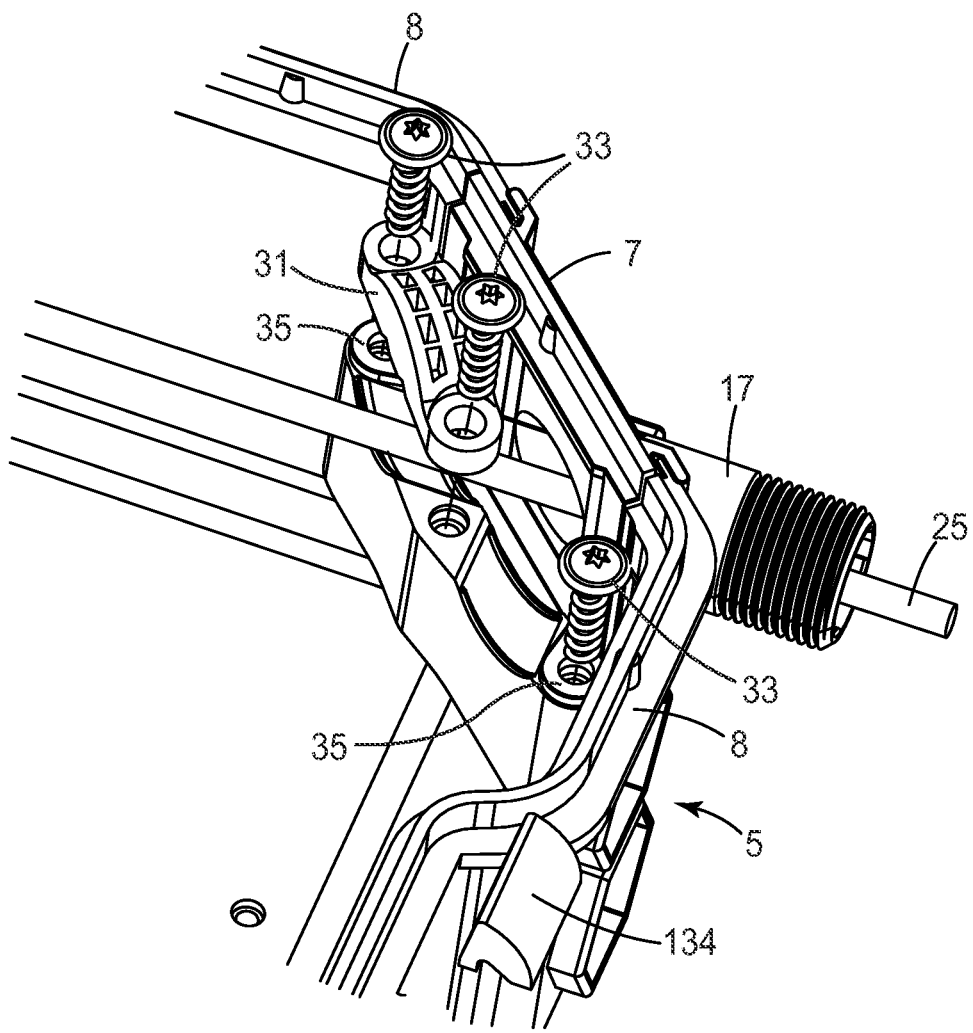

FIG. 3 also shows that each side edge of the wall sections 7A, 7B comprises a channel 19 having a central baffle 21, the purpose of which will be described below. FIG. 4A illustrates a first step in the installation of main service cable in the housing 1. One corner wall part 15 has already been placed in position and it can be seen that the channel 19 on each side edge of the wall section 7A is wide enough to fit around the exposed end of the adjacent side 8 of the base 5. It can also be seen that the central baffle 21 in the channel 19 is then located in a channel 23 in the exposed end of the adjacent side 8 of the base 5. The main service cable 25 is then placed in position in the open half 17A of the cable guide and in an aligned guide 27 formed in a permanent support 29 inside the housing 1. The corner wall part 16 is then placed in position over the main service cable 25, as shown in FIG. 4B to complete this corner wall 7 of the housing 1 and the cable guide 17. A cable grip 31 is then placed in position over the cable on the support 29, and screws 33 are used to secure the cable grip in position and to secure the two corner wall parts 15, 16 together through eyelets 35 as shown in FIG. 4C.

The engagement of the corner wall 7 with the adjacent sides 8 of the base 5, formed by the interengagement of the channels 19 and their central baffles 21 with the channels 23, effectively constitutes a labyrinth seal and may in itself be sufficiently watertight to prevent the entry of moisture into the housing in this region. If required, however, additional sealing material can be included, for example in the channels 19 and/or the channels 23.

Figure 5A:
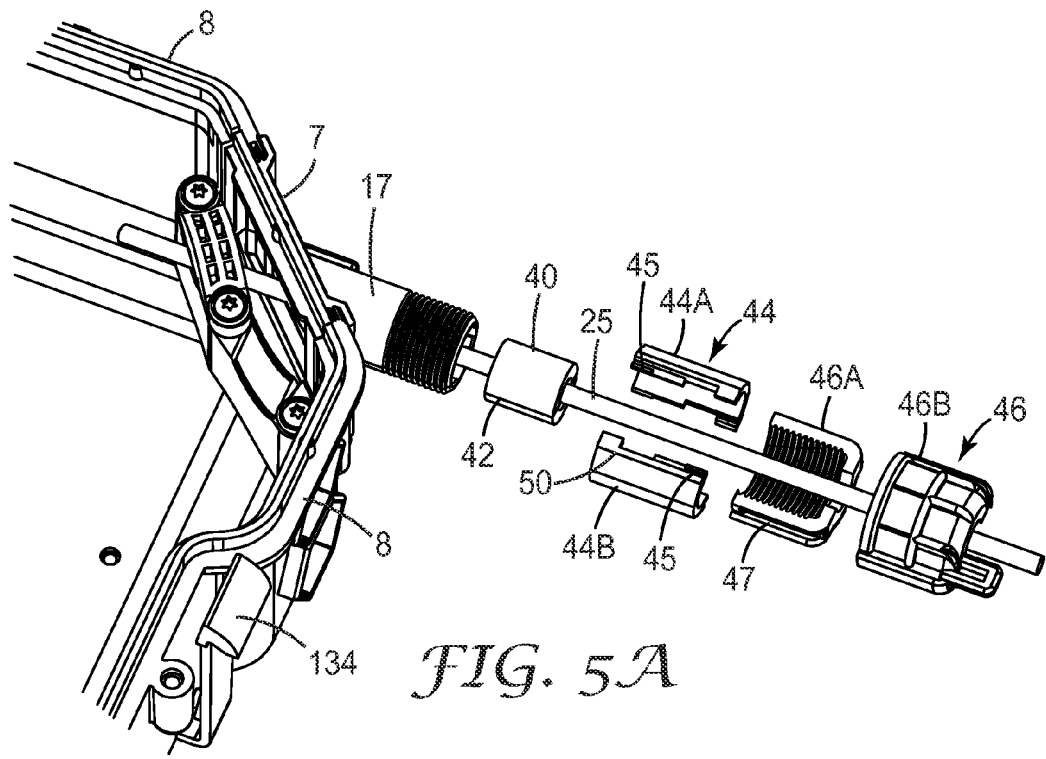
FIGS. 5A and 5B are similar to FIGS. 4A to 4C but show successive stages in sealing a cable in the cable entry/exit portion.
Figure 5B:
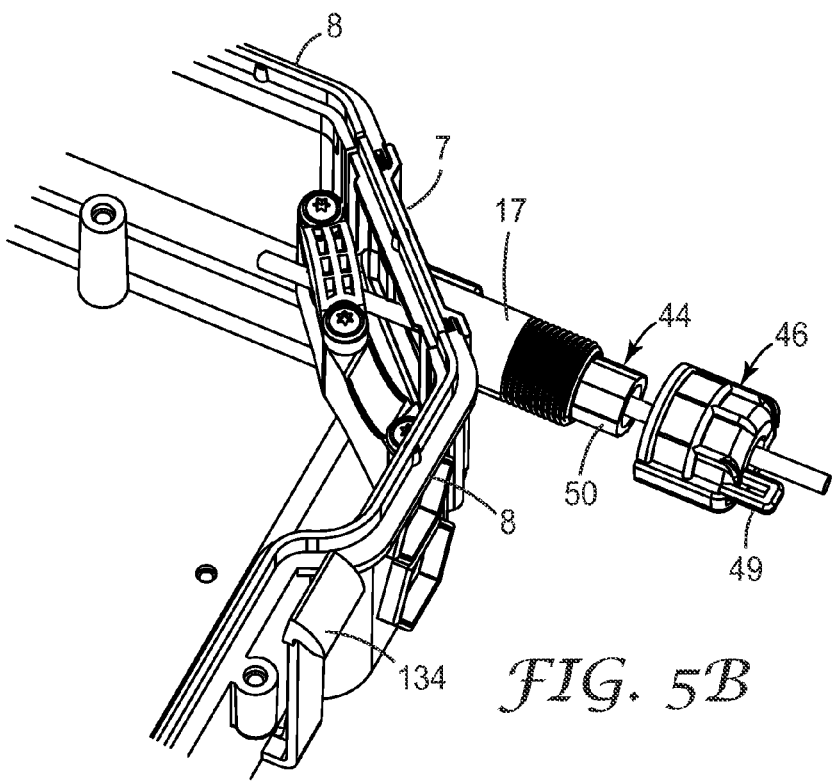

The main service cable 25 can then be sealed in the cable guide 17 using a cable sealing assembly 40, 44, 46 in the manner illustrated in FIGS. 5A and 5B to prevent the entry of moisture into the housing in this region. The components of the cable sealing assembly comprise a cylindrical sealing gasket 40 of any suitable compressible material, an abutment member 44 and a locking member in the form of an internally-threaded locking nut 46. As shown in FIG. 5A, the sealing gasket 40 is slit lengthwise at 42 to enable it to be place around the main service cable 25; the abutment member 44 is provided in the form of two parts 44A, 44B with mating features 45 along their side edges, which can be placed around the main service cable 25 and brought into mating engagement; and the locking nut 46 is provided in the form of two parts 46A, 46B with interengaging features 47 along their side edges, which can be placed around the cable main service cable 25 and slid into engagement with one another.

The sealing gasket 40 is first placed around the main service cable 25 and pushed into the cable guide 17, followed by the two parts 44A, 44B of the abutment member. During this part of the procedure, the two parts 44A, 44B of the abutment member are held together by the cable guide 17, and their orientation within the guide is defined by longitudinally-extending features 50 on their external surfaces which co-operate with mating features 51 (see FIGS. 3 and 4A) on the internal surface of the cable guide. The movement of the sealing gasket 40 into the cable guide 17 is limited by a stop in the form of a circumferential flange 48 within the guide, one part of which is visible in FIG. 4A.

The two parts 46A, 46B of the locking nut are then placed around the main service cable 25, axially-displaced from one another as shown in FIG. 5A, and are slid together into engagement to form the completed nut 46. The sealing assembly is now as illustrated in FIG. 5B. The locking nut 46 is now screwed onto the threaded end of the cable guide 17 (if necessary, using a lever inserted through an eyelet 49 on the nut), causing the abutment member 44 to move further into the cable guide and compress the sealing gasket 40 in the longitudinal direction. As a result, the sealing gasket 40 will expand in the radial direction and seal against the outside surface of the main service cable 25 and the inside surface of the cable guide 17. During this procedure, rotation of the abutment member 44 within the cable guide 17 and, more especially, against the end of the sealing gasket 40 is prevented by the engagement of the features 50, 51. This is particularly important because the slit 42 in the sealing gasket 40 could otherwise be caused to open up by the rotation of the abutment member 44.

It will be understood that the procedure at the other corner wall 7 of the base 5 of the housing follows that described above with reference to FIGS. 4 and 5.

Figure 6:
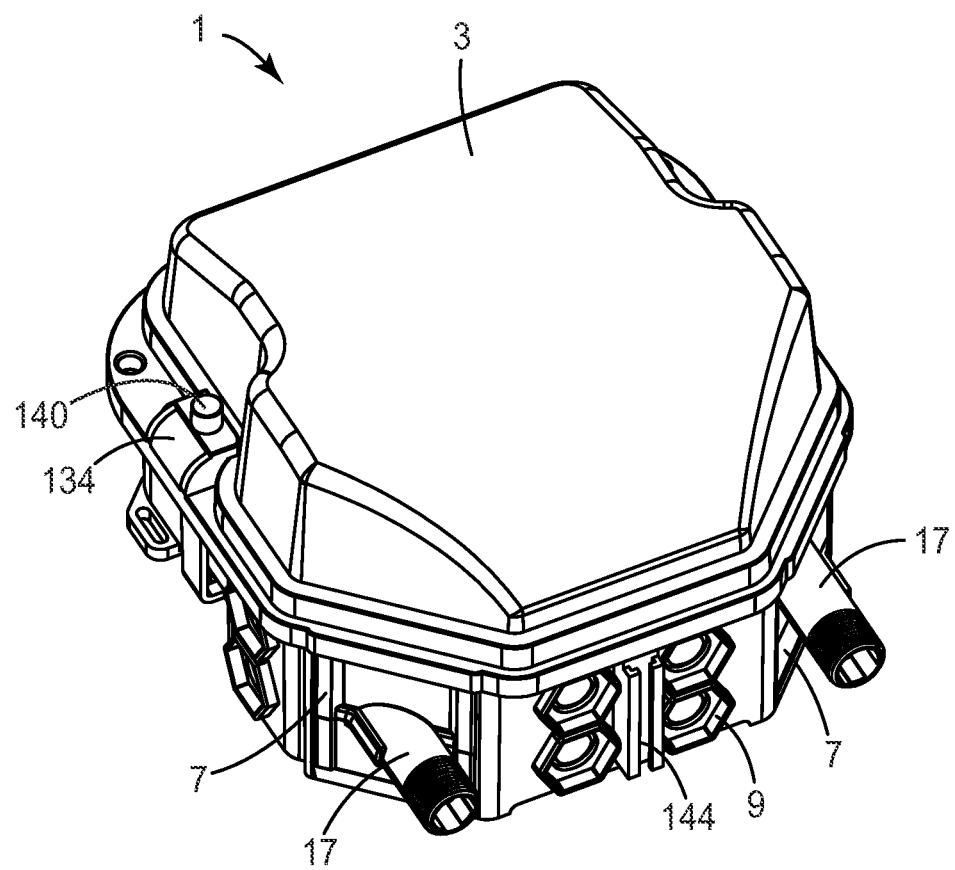
FIG. 6 is similar to FIG. 1 but shows the cable entry and exit portions in a different orientation.

FIG. 6 shows the housing 1 with the corner walls 7 repositioned so that both cable guides 17 extend from the housing in what would be the vertical direction when the housing is mounted on a vertical surface. As an alternative, one of the cable guides could extend in the horizontal direction and the other in the vertical direction. It will be seen from FIGS. 4A to 4C that the support 29 inside the housing 1 provides guides 27 for the cables in all of these orientations. However, the support 29 could be omitted if there is sufficient alternative support for the main service cable 25 in the housing 1.

Connections can now be set up in the normal way, within the housing 1, between the main service cable 25 and, for example, drop cables that pass through the housing at one or more of the provided entry port locations 9. In the present example, in which the cables are optical fibre cables, only some of the fibres of the main service cable 25 may need to be utilized in which case it may be necessary only to open a window in the outer jacket of the main service cable 25 to enable connections to be made to selected fibres only. In other cases, the main service cable may be cut completely and connections made to all of the optical fibres contained therein. These procedures are well known and will not be described here.

It is conventional for re-enterable splice enclosures for telecommunications cables, such as the housing 1 described above, to provide storage in an organized manner for lengths of slack cable and for the connections between telecommunication lines, to facilitate the subsequent management of the cables and the line connections. Splice enclosures for optical fibre cables are often provided with splice trays to facilitate the splicing between optical fibres as well as the organisation and subsequent management of those splices.

Figure 7:
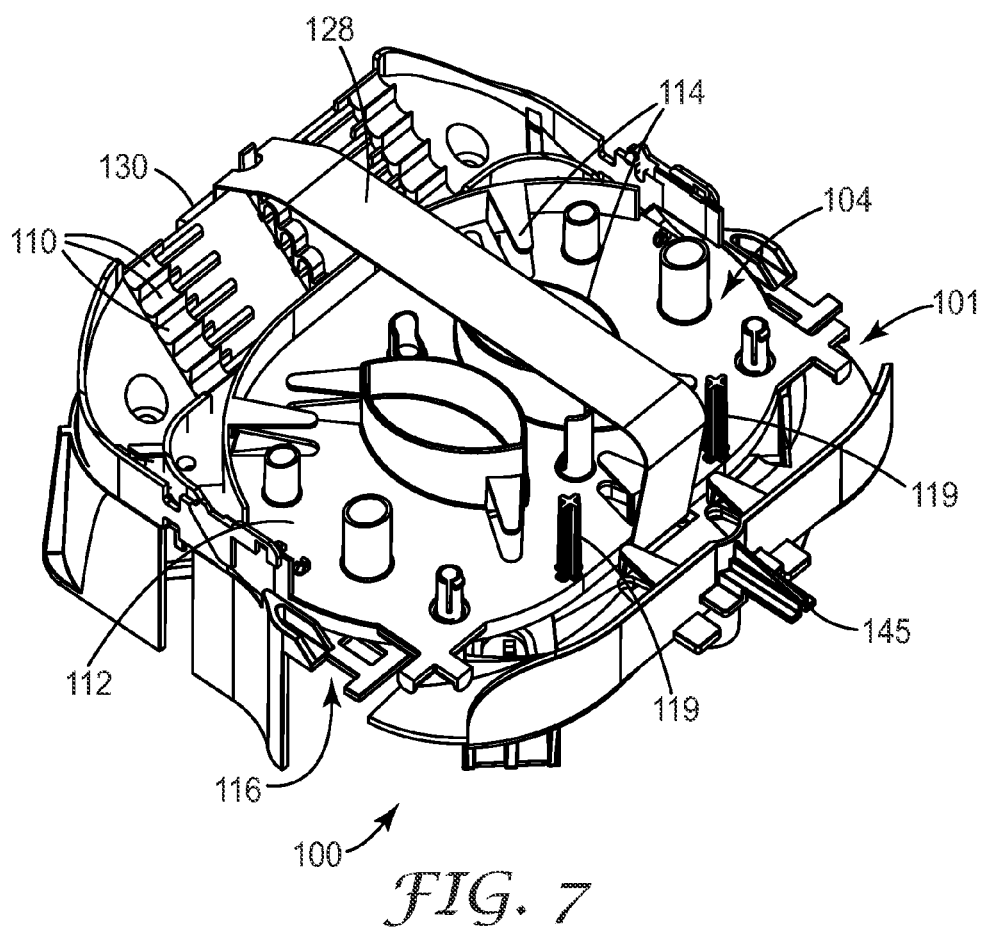
FIG. 7 is a perspective view from one side of an organizer for use in the housing of FIG. 1.
Figure 8:
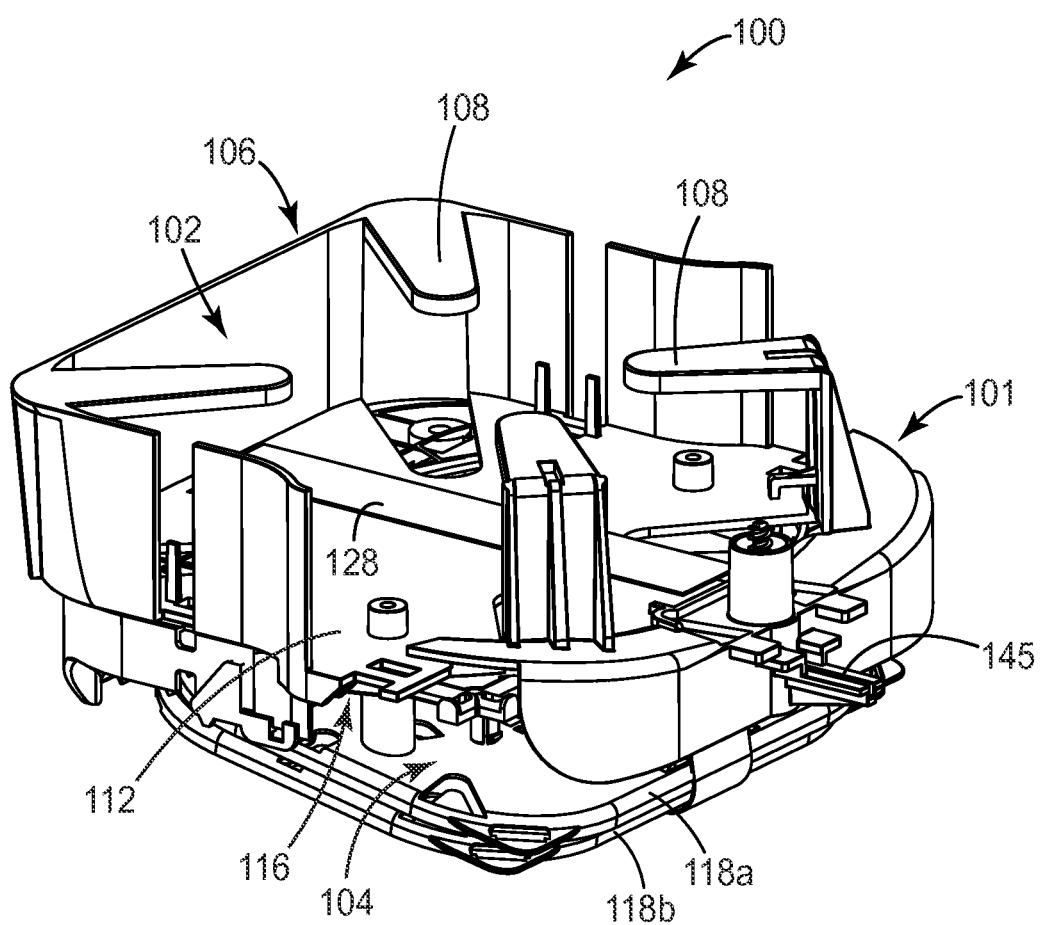
FIG. 8 is a perspective view of the organizer from the other side.

FIGS. 7 and 8 show a preferred organizer 100 for use in the housing 1. The organizer comprises a platform (indicated generally at 101) having, on one side, a compartment 102 for storage of slack cable and, on the other side and in back-to-back relationship thereto, a support 104 for a stack of splice trays. FIG. 7 shows the organizer 100 with the support 104 uppermost, this being the orientation in which it will be inserted into the housing 1. FIG. 8 shows the organizer 100 inverted (i.e. with the slack cable compartment 102 uppermost) for receiving slack cable. In this case, the platform 101 effectively comprises two layers namely the support 104 and the base of the compartment 102, but it will be appreciated that it could comprise one layer only.

The slack cable compartment 102 has enclosing walls 106 towards the rear but is open at the front to provide access for cables passing into the compartment through the housing 1, either via the cable guides 17 or at the entry port locations 9. As described in more detail below, cable can be wound in a circular manner within the compartment 102, being contained by inwardly-turned feet 108 which, when the organizer is inserted into the housing 1, rest on the bottom 13 of the base 5.

The support 104 has an upstanding rack of channels 110 at its rear for receiving splice trays. The channels 110 are arranged one above the other and allow the inserted splice trays, which will be stacked one above the other, to be pivoted upwards so that any one of them can be accessed as required. Arrangements of that type for splice trays are well known. The main part 112 of the support carries a variety of upstanding routing structures 114 about which optical fibres, fibre bundles and/or cables can be wound in known manner, as desired. Openings 116 at the edges of the organizer 100 provide passage for optical fibres, fibre bundles and/or cables between the two sides of the organizer (i.e. between the slack cable storage compartment 102 and the support 104).

Figure 9:
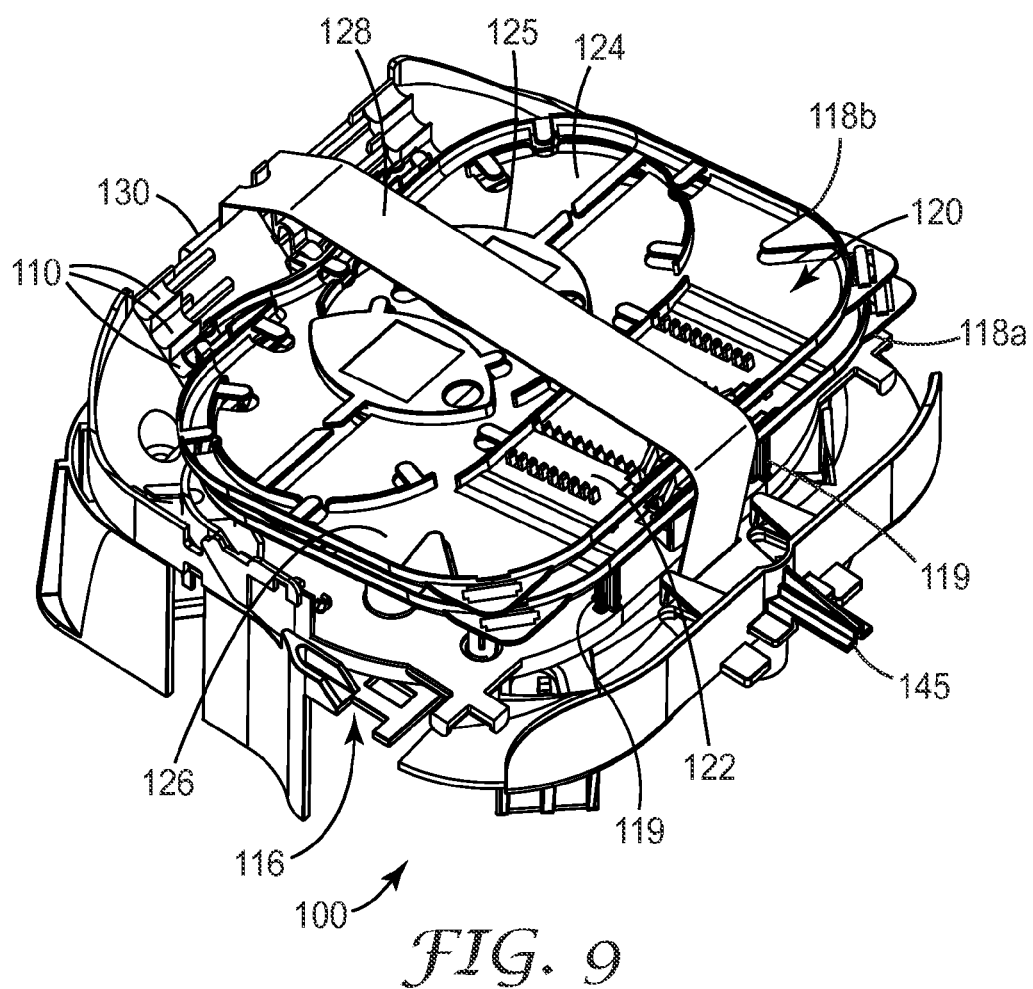
FIG. 9 is similar to FIG. 7, with the addition of splice trays to the organizer.

FIG. 9 shows the organizer 100 as in FIG. 7 but with two splice trays 118a, 118b inserted in the lowest of the channels 110. The front of the splice tray 118a rests on two upstanding posts 119 provided by the support 104, and the splice tray 118b is stacked on top of that. Fibres are fed to the splice tray 118a from the support 104 through a space at the back of the tray. A splicing area 120, which accommodates conventional splice inserts 122, is provided at the front of the tray and a fibre routing area 124 is provided at the rear. The fibre routing area 124 contains fibre routing structures 125 about which optical fibres can be wound as desired, and may also provide some space for slack fibre storage. An optional cover 126 may be fitted to the tray after the fibres and the splices have been installed. It will be understood that a plurality of similar splice trays could be located in the other channels 110 and stacked on top of the tray 118b. A strap 128 passes around the stack of trays 118a, 118b, from the base of the compartment 102, to hold the stack together when the trays are not being accessed. Advantageously, the strap 128 is a self-gripping tape, thereby eliminating the need for any additional fixing elements to hold the tape around the stack of splice trays.

It will be understood that the actual design of the splice trays 118a, 118b can be modified as required to suit the circumstances in which the organizer 100 is being used.

An arm 130 is provided at the rear of the organizer 100, on the outside of the slack cable compartment 102 (see FIGS. 11 and 12), to engage with guides 132 in the base 5 of the housing 1 (see FIG. 2) and hold the organizer in place when it is inserted into the housing. The housing is then closed by the cover 3 which is held in place by inwardly-displaceable arms 134, one on each side of the base 5, with hooked ends that engage in openings in the cover. If desired, the cover 3 can be further secured by inserting screws 140 through the cover and into the space between the arms 134 and the base 5, thereby preventing inward movement of the arms which could release the cover.

Figure 10:
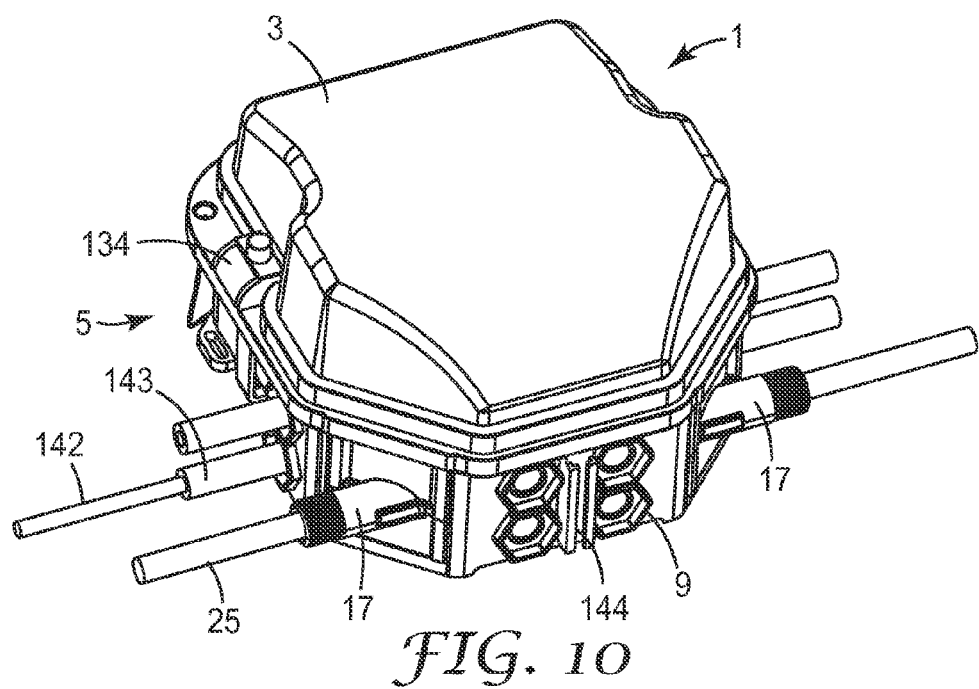
FIG. 10 shows the assembled housing with cables.

FIG. 10 shows the closed housing 1, with the installed main service cable 25 and one drop cable 142 (both extending horizontally in this case). The drop cable 142 extends into the housing 1 through a conventional cable gland 143 installed in the housing at one of the above-mentioned entry port locations 9.

Figure 11:
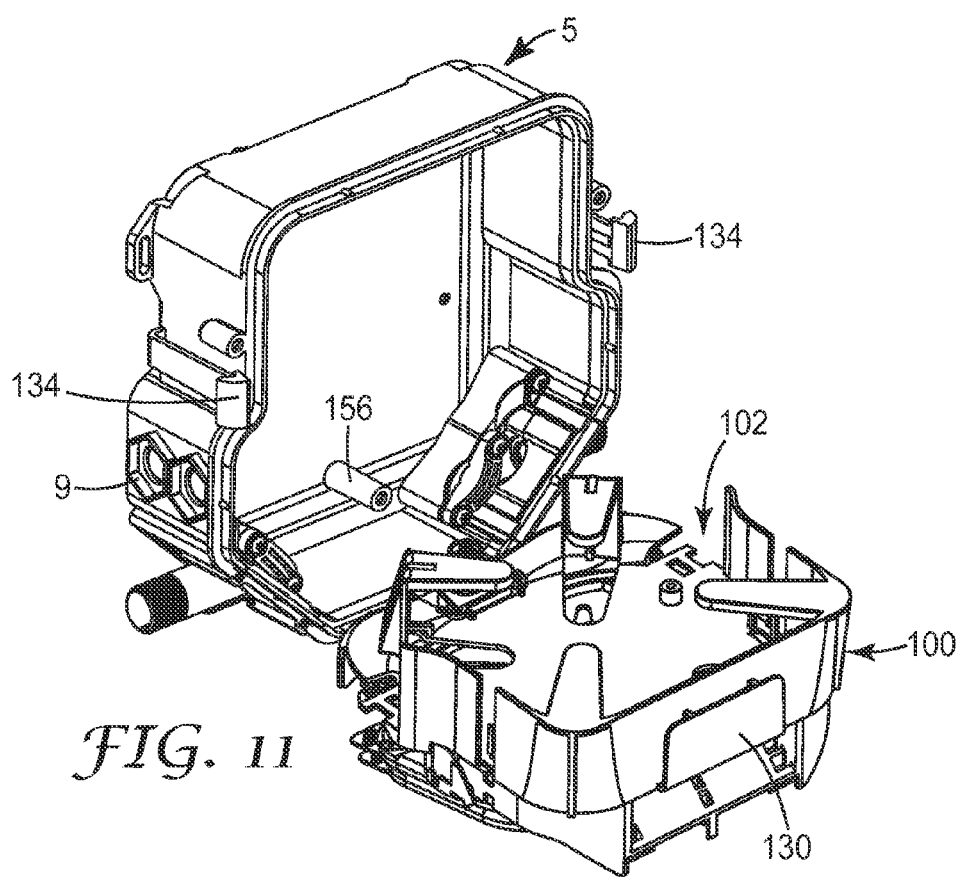
FIG. 11 is a perspective view of the base of the housing, showing the organizer supported on the base in a "work bench" position.

When access is required to the interior of the housing 1, for example to add or remove a drop cable, the cover 3 is opened by first removing the screws 140, if used, and then displacing the arms 134 inwards. The cover can then be pivoted into an open position on the base 5, or removed completely and left to hang freely from the cord by which it is tied to the base 5 as mentioned above. The organizer 100 can then be removed completely from within the base 5, bringing with it the slack cable that is stored in the compartment 102. If a suitable location is available at which the work, including any necessary splicing can be carried out, the organizer 100 can be removed to that location with slack cable being fed out from the compartment 102 as required. To facilitate the replacement of the slack cable in the compartment 102, the organizer 100 is provided with an arm 145 that projects from the front of the compartment and, by inverting the organizer, can be inserted into a guide 144 on the lower wall of the housing base 5 (see FIG. 1) thereby supporting the organizer in a horizontal "work bench" position as shown in FIG. 11 (from which all cables have been omitted for clarity) with the compartment 102 uppermost. The operator then has both hands free to load the slack cable into the compartment 102, following which the organizer 100 can be put back into the housing 1 as described above. Alternatively, when the organizer is removed from the housing 1, it can immediately be supported on the base 5 in the "work bench" position shown in FIG. 11 so that any work on the cables, for example the addition of a drop cable, can be carried out by the operator with both hands free following which any slack cable can be wound into the compartment 102. The organizer can then be replaced in the base 5 and the splice trays 118a, 118b will then be accessible for hands-free manual splicing of optical fibres to be carried out as required. It will be appreciated that alternative structures could be provided to enable the organizer to be supported in the "work bench" position on the base 5 and could, if required, enable the organizer to be supported (alternatively or in addition) in the inverted position i.e. with the support 104 and the splice trays 118 uppermost.

Figure 12:
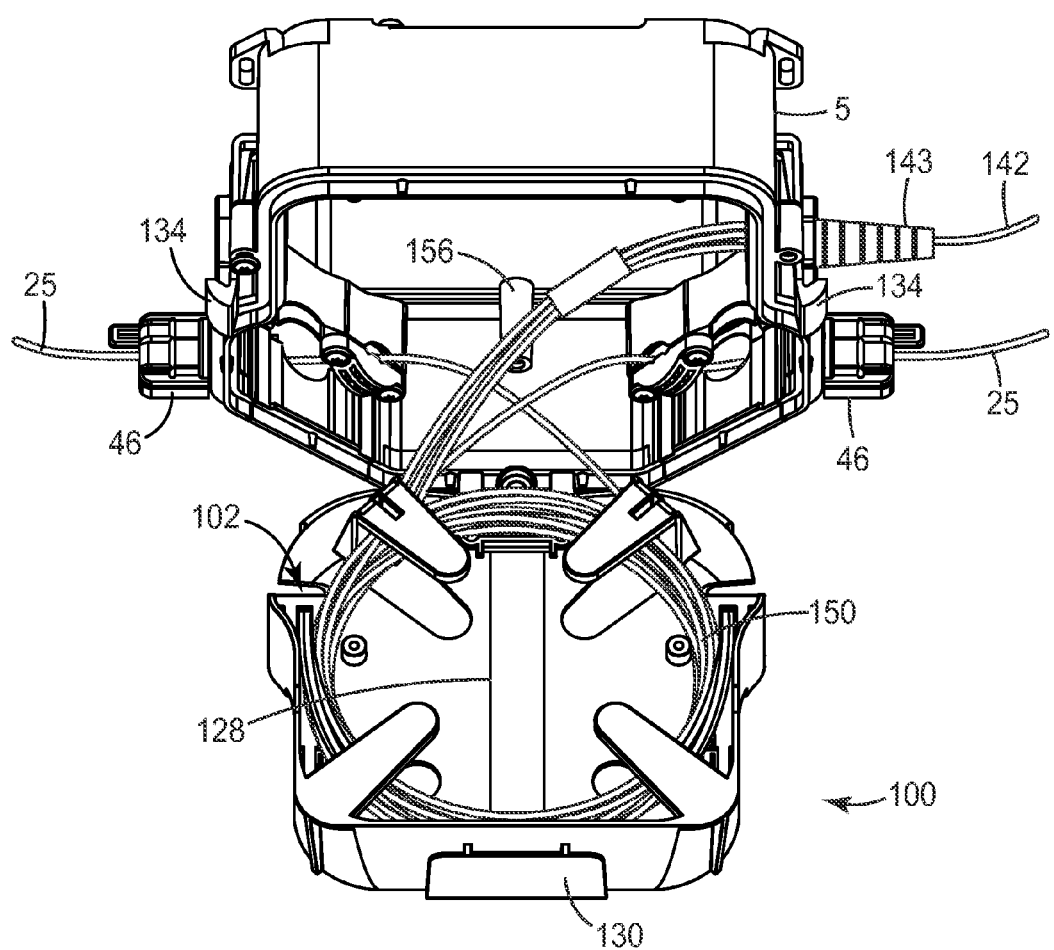
FIG. 12 is a view of the base from above, showing the organizer supported as in FIG. 11 and illustrating the use of the cable storage area of the organizer.
Figure 13:
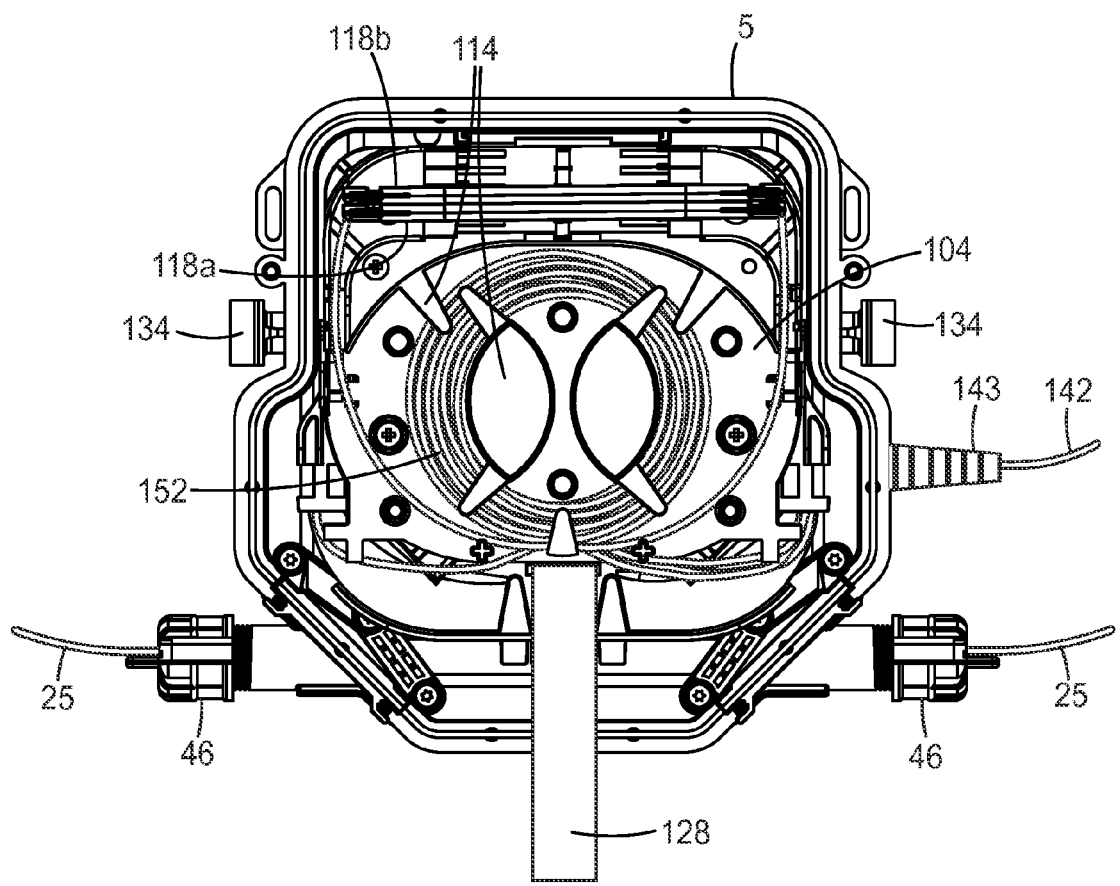
FIG. 13 is a front view of the base, showing the organizer positioned in the base with the splice trays in the raised position.
Figure 14:
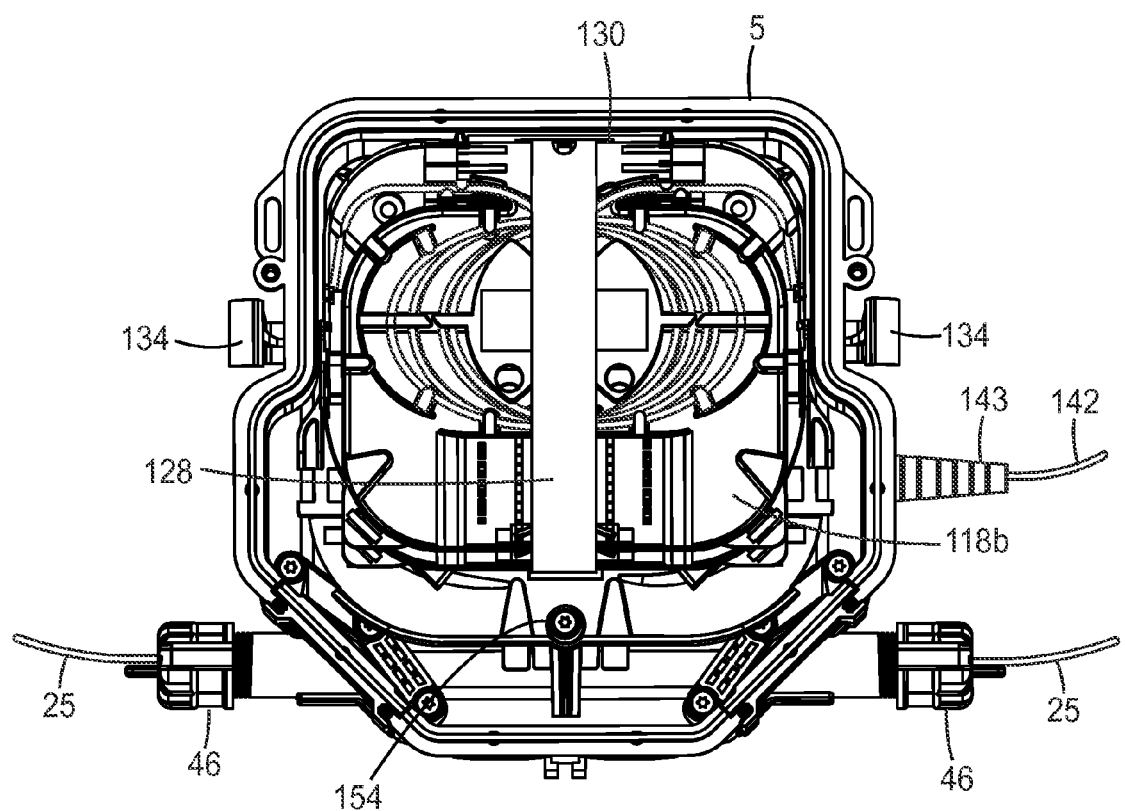
FIG. 14 is similar to FIG. 13 but shows the splice trays in the stacked position.

FIGS. 12 to 14 illustrate parts of the procedure just described:

FIG. 12 shows the organizer 100 supported on the base 5 of the housing in the "work bench" position, with fibre bundles 150 from both the main service cable 25 and a drop cable 142 wound into the slack storage compartment 102. In some cases, a length of the sheathed main service cable 25 may also be wound into the compartment 102, in which case that part of the cable may be separately secured by brackets to prevent it from springing out of place. The fibre bundles 150 may be secured in place by self-gripping tape (not shown) wound around the bundles and secured to that part of the strap 128 that is located on the base of the compartment 102.

FIG. 13 shows the organizer 100 after it has been removed from the position shown in FIG. 12 and replaced in the base 5 of the housing, with the splice trays in the raised position to provide access to the support 104 on which are wound fibre bundles 152 from the compartment 102 on the other side of the organizer.

FIG. 14 is similar to FIG. 13 but shows the splice trays 118*a*, 118*b* returned to the stacked position prior to the replacement of the cover 3 of the housing 1.

It will be understood that various modifications can be made to the housing 1 described above with reference to the drawings. For example, the directions in which the repositionable cable guides 17 extend from the housing could be changed, or one or both of the guides could be replaced by fixed-direction guides. The repositionable portions of the housing (i.e. the corner walls 7 in the embodiment described above) also do not need to be positioned at an angle as shown to the adjacent sides of the housing, although that does assist in changing the directions in which the cable guides 17 extend from the housing. It will also be understood that the repositionable portions of the housing and the cable guides 17 need not be formed in two parts if the main service cable 25 is cut. It is also possible to use an alternative form of sealing assembly in the cable guides 17: for example, if the main service cable 25 is cut, a sealing assembly of the type described in U.S. Pat. No. 6,487,344 could be used. Modifications could also be made to the manner in which the cover 3 attaches to the base 5 of the housing or, more generally, to the overall shape of the housing. For example, the arms 134 on the sides of the base 5 could be replaced by a single catch at the front of the housing 1 (as seen in FIG. 1). In addition the number, position, size and shape of the entry port locations 9, provided on the base 5 for the passage of secondary cables, can be varied.

Other forms of organizer could be used in the housing 1 including, for example, organizers in which the splice tray(s) and the slack cable storage compartment are accessible from the same side of the organizer, typically with the splice trays being located over the slack cable storage compartment. Alternatively, organizers that do not provide any slack cable storage could be used, with any slack cable being stored directly in the base 5 of the housing. An organizer of that type can, in fact, be provided simply by removing the slack storage compartment 102 from the organizer 100 described above. In some cases (for example, when the housing 1 is located inside a building) no slack cable storage may be required at all, and the depth of the housing 1 can then be reduced by replacing the cover 3 shown in the drawings by a shallower cover. The arm 130 and guide 132 that are used to locate the organizer 100 in the base 5 of the housing can be replaced or supplemented by other arrangements. For example, the organizer 100 may be secured in the base 5 by a screw inserted through the organizer, at the location 154 indicated in FIG. 14, into a post 156 in the base 5 (see FIGS. 11 and 12).

The use of repositionable cable guides 17 as described above with reference to FIG. 3 offers the advantage of being able to adapt the housing 1 very easily for use in a wide variety of situations. A single housing as described can provide access for a main system cable that enters and leaves the housing in a horizontal direction; that enters and leaves in a vertical direction; or that enters in a horizontal direction and leaves in a vertical direction, or vice versa. It will be appreciated that similar repositionable cable guides could be used the in other forms of telecommunications enclosures to enhance their versatility.

The two-part construction of each of the corner walls 7 of the housing 1 and the cable guides 17 enables this part of the housing to be completed after a cable has been passed into/out of the housing and is of particular advantage when the cable is uncut. Completion of a corner wall 7 when the cable is in position is advantageously simple, only requiring two of the screws 33 to be secured in the eyelets 35. The securing of the cable within the housing by means of the cable grip 31 is also advantageously simple and can be carried out at the same time. This simplicity is particularly important when the housing 1 is not easily accessible.

The particular form of sealing assembly described above with reference to FIGS. 5A and 5B for use in the cable guides 17 offers the advantage of comparative simplicity and of being easily assembled around a cable to provide effective sealing. The assembly is of particular advantage in the situation in which an uncut cable is positioned in the cable guide, making it impossible to put a sealing assembly into position from the cut end of the cable. The simplicity of the sealing assembly is particularly advantageous when the cable guide is part of a telecommunications enclosure in an inaccessible location, for example high up on the façade of a building. It will be appreciated that similar sealing assemblies could be used in cable guides in other forms of telecommunications enclosures.

The particular form of organizer 100 described above with reference to FIGS. 7 to 9 offers the advantage of providing not only storage for both slack cable and splice trays but of being completely removable from the telecommunications enclosure so that work on the cables and splices can be carried out at a more convenient location without disturbing the existing line connections within the enclosure. The organizer can be removed to a location at which the fibres to be spliced can be prepared and then routed to one of the splice trays, and the splicing operation can be carried out using conventional manual or fusion splicing methods. Alternatively, as described above, manual splicing can be carried out while the organizer remains positioned in the base of the housing. The positioning of the slack cable space and the splice trays on opposite sides of the organizer makes it possible to offer easy access to both. The possibility of mounting the removed organizer on the base of the box enables the operator to use both hands to store slack cable in the organizer, which is also particularly advantageous when the organizer is part of a telecommunications enclosure in an inaccessible location, for example high up on the façade of a building.

What is claimed is:

1. An enclosure for receiving at least one telecommunication cable, the enclosure comprising a housing at least one portion of which includes an outwardly-extending cable guide configured for the passage of a telecommunications cable into/out of the enclosure, wherein the said housing portion, including the cable guide, is split to enable it to be placed around a cable after the cable has been passed into/out of the enclosure and is repositionable in the housing to change the direction of the cable guide relative to the housing.

2. An enclosure as claimed in claim 1, in which the direction of the cable guide relative to the housing can be changed by removing the said housing portion from the housing, turning the housing portion through 180°, and replacing the housing portion in the housing.

3. An enclosure as claimed in claim 2, in which the cable guide extends at substantially 45° from the said housing portion, whereby the direction of the cable guide relative to the housing can be changed by turning the housing portion through 180° relative to the housing.

4. An enclosure as claimed in claim 1, in which the said housing portion is slideable into and out of the housing.

5. An enclosure as claimed in claim 1, in which the said housing portion is formed in two parts that are releasably-secured together in sealing engagement with the remainder of the housing.

6. An enclosure as claimed in claim 1, including a sealing assembly for a cable in the cable guide, the sealing assembly comprising a sealing gasket that surrounds the cable and, at one end, abuts a stop within the cable guide and, at the other end, is engaged by an abutment member; and a locking member that secures around the cable guide to retain the sealing gasket and the abutment member therein and to move the abutment member along the cable within the cable guide to compress the sealing gasket longitudinally and cause it to expand radially to seal against the outside of the cable and the inside of the cable guide;
  wherein the sealing gasket, the abutment member and the locking member are each split in the lengthwise direction of the cable whereby the sealing assembly can be fitted to the cable after the cable has been passed into/out of the housing, and wherein the abutment member is constrained against rotation within the cable guide.

7. An enclosure as claimed in claim 1, in which the housing contains an organizer; the organizer comprising a support which, on one side, has a compartment accessible from one direction for the storage of slack cable and, on the opposite side, has a support accessible from the other direction for at least one cable splice tray; wherein the organizer, together with the storage compartment and the splice tray(s) and any slack cable/spliced telecommunication lines therein, is removable from the housing.

8. An enclosure for receiving at least one telecommunication cable, the enclosure comprising a housing at least one portion of which includes an outwardly-extending cable guide configured for the passage of a telecommunications cable into/out of the enclosure, wherein the said housing portion, including the cable guide, is split to enable it to be placed around a cable after the cable has been passed into/out of the enclosure; and a sealing assembly for a cable within the cable guide, the sealing assembly comprising a sealing gasket that surrounds the cable and, at one end, abuts a stop within the cable guide and, at the other end, is engaged by an abutment member; and a locking member that secures around the cable guide to retain the sealing gasket and the abutment member therein and to move the abutment member along the cable within the cable guide to compress the sealing gasket longitudinally and cause it to expand radially to seal against the outside of the cable and the inside of the cable guide;
  wherein the sealing gasket, the abutment member and the locking member are each split in the lengthwise direction of the cable whereby the sealing assembly can be fitted to the cable after the cable has been passed into/out of the enclosure, and wherein the abutment member is constrained against rotation within the cable guide.

9. An assembly as claimed in claim 8, in which the abutment member is constrained against rotation within the cable guide by the mating engagement of features on the external surface of the abutment member and the internal surface of the cable guide.

10. An assembly as claimed in claim 8, in which the locking member is threadedly-engageable with the cable guide.

11. An assembly as claimed in claim 8, in which the sealing gasket has a single split only, and the abutment member and the locking member are both formed in two parts whereby they can be fitted to the cable after the cable has been passed into/out of the enclosure.

12. An enclosure for receiving at least one telecommunications cable, the enclosure comprising a housing containing an organizer unit; the organizer comprising a platform which, on one side, has a compartment accessible from one direction for the storage of slack cable and, on the opposite side, has a support accessible from the other direction for the storage of at least one cable splice tray; wherein the organizer, together with the storage compartment and the splice tray(s) and any slack cable/spliced telecommunication lines therein, is removable from the housing.

13. An enclosure as claimed in claim 12, in which the housing has a closable opening through which the organizer can be removed, the organizer being positioned in the housing with the storage compartment remote from the opening.

14. An enclosure as claimed in claim 12, in which the said support also provides storage for at least one telecommunication line.

15. An enclosure as claimed in claim 12, in which the support provides storage for a stack of pivotally-movable splice trays.

16. An enclosure as claimed in claim 12, in which the organizer, following removal from the housing, can be engaged with the housing on the outside thereof, in a position providing access to the storage compartment.

17. An enclosure as claimed in claim 12, in which the housing is closed by a cover; and in which the/each splice tray is accessible, when the cover is opened/removed, without removing the organizer from the housing.

* * * * *